United States Patent
Park (10) Patent No.: US 11,205,804 B2
(45) Date of Patent: Dec. 21, 2021

(54) BMS WAKE-UP DEVICE, AND BMS AND BATTERY PACK INCLUDING SAME

(71) Applicant: LG CHEM, LTD., Seoul (KR)

(72) Inventor: Jong-Il Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 156 days.

(21) Appl. No.: 16/654,827

(22) Filed: Oct. 16, 2019

(65) Prior Publication Data

US 2020/0052346 A1 Feb. 13, 2020

Related U.S. Application Data (63) Continuation of application No. PCT/KR2018/013488, filed on Nov. 7, 2018.

(30) Foreign Application Priority Data

Nov. 7, 2017 (KR) .......................... 10-2017-0147190

(51) Int. Cl.
  *H02J 7/00* (2006.01)
  *H01M 10/42* (2006.01)
  *H01M 10/48* (2006.01)

(52) U.S. Cl.
  CPC ......... *H01M 10/425* (2013.01); *H01M 10/48* (2013.01); *H02J 7/0026* (2013.01); *H01M 2010/4271* (2013.01)

(58) Field of Classification Search
  USPC ....................................................... 320/134
  See application file for complete search history.

(56) References Cited

U.S. PATENT DOCUMENTS

| | | |
|---|---|---|
| 2004/0178766 A1 | 9/2004 | Bucur et al. |
| 2011/0304299 A1 | 12/2011 | Yang et al. |
| 2012/0032639 A1 | 2/2012 | Kim et al. |

(Continued)

FOREIGN PATENT DOCUMENTS

| | | |
|---|---|---|
| JP | 2005-27496 A | 1/2005 |
| JP | 2013-102649 A | 5/2013 |

(Continued)

OTHER PUBLICATIONS

International Search Report for PCT/KR2018/013488 dated Feb. 20, 2019.

(Continued)

*Primary Examiner* — Bryce M Aisaka
(74) *Attorney, Agent, or Firm* — Birch, Stewart, Kolasch & Birch, LLP (57) ABSTRACT

A device for waking up a battery management system (BMS) in response to an external power signal received from an external power module, and includes a pulse generator which receives the external power signal from the external power module and is supplied with source power through a different path from the external power signal, and generates a pulse signal depending on whether the source power is passed through when the pulse generator receives the external power signal, and a power output module which supplies the source power to the pulse generator, and outputs operating power for operating the BMS based on the pulse signal when the power output module receives the pulse signal from the pulse generator.

20 Claims, 8 Drawing Sheets

(56) References Cited

U.S. PATENT DOCUMENTS

| | | | |
|---|---|---|---|
| 2012/0181987 A1* | 7/2012 | Lee | H02J 7/00308 320/128 |
| 2013/0066519 A1 | 3/2013 | Yoshikawa et al. | |
| 2013/0113427 A1 | 5/2013 | Noda et al. | |
| 2013/0127418 A1 | 5/2013 | Oh et al. | |
| 2015/0349547 A1 | 12/2015 | Jeon | |
| 2017/0025877 A1 | 1/2017 | Xintian et al. | |
| 2017/0163064 A1 | 6/2017 | Liu et al. | |
| 2018/0294664 A1 | 10/2018 | Hong et al. | |

FOREIGN PATENT DOCUMENTS

| | | |
|---|---|---|
| JP | 5847506 B2 | 1/2016 |
| KR | 10-2012-0013776 A | 2/2012 |
| KR | 10-2012-0136828 A | 12/2012 |
| KR | 10-2013-0078028 A | 7/2013 |
| KR | 10-1480090 B1 | 1/2015 |
| KR | 10-2015-0137678 A | 12/2015 |
| KR | 10-1582577 B1 | 1/2016 |
| KR | 10-1629172 B1 | 6/2016 |
| KR | 10-1700805 B1 | 1/2017 |
| KR | 10-2017-0035229 A | 3/2017 |
| KR | 10-1741643 B1 | 6/2017 |
| WO | WO 2017/039165 A1 | 3/2017 |

OTHER PUBLICATIONS

European Extended Search Report dated Jun. 19, 2020 corresponding EP Patent Application No. 18876478.1.

* cited by examiner

BMS WAKE-UP DEVICE, AND BMS AND BATTERY PACK INCLUDING SAME

CROSS-REFERENCE TO RELATED APPLICATIONS

This application is a By-Pass Continuation of PCT International Application No. PCT/KR2018/013488, filed on Nov. 7, 2018, which claims priority under 35 U.S.C. § 119(a) to Korean Patent Application No. 10-2017-0147190, filed in the Republic of Korea on Nov. 7, 2017, all of which are hereby expressly incorporated by reference into the present application.

TECHNICAL FIELD

The present disclosure relates to a battery management system (BMS) wake-up device, and a BMS and a battery pack including same, and more particularly, to waking up a BMS in response to an external power signal received.

BACKGROUND ART

Recently, there is dramatically growing demand for portable electronic products such as laptop computers, video cameras and mobile phones, and with the extensive development of accumulators for energy storage, robots and for satellites, many studies are being made on high performance secondary batteries that can be recharged repeatedly.

Currently, commercially available secondary batteries include nickel-cadmium batteries, nickel-hydrogen batteries, nickel-zinc batteries, lithium secondary batteries and the like, and among them, lithium secondary batteries have little or no memory effect, and thus they are gaining more attention than nickel-based secondary batteries for their advantages of free charging and discharging, a very low self-discharge rate and high energy density.

Battery packs are used in various fields, and in many cases, they are used in applications requiring large capacity, such as electric-drive vehicles or smart grid systems. To increase the capacity of battery packs, an attempt may be made to increase the capacity of secondary batteries or battery cells themselves, but in this case, the capacity increase effect is not that large, and there is a physical limitation on the size expansion of the secondary batteries. Accordingly, generally, a battery pack including a plurality of battery modules connected in series and in parallel is widely used.

In many cases, the battery pack includes a Battery Management System (BMS) to manage the battery module. The BMS monitors the temperature, voltage and current of the battery module, and controls the balancing operation, cooling operation, charging operation or discharging operation of the battery pack based on the monitored state of the battery module. The BMS operates in a manner and includes components as understood by one of ordinary skill in the art.

In particular, a BMS provided in a considerable number of battery packs, for example, a 12V lithium battery pack, may operate using power supplied from a battery module included in the corresponding battery pack. However, in this configuration, due to the electric current consumption by the BMS, no matter how small the value is, the battery pack may be overdischarged or fully discharged. For example, if the BMS continues to operate in a situation in which charge energy of the battery module is insufficient, charge energy of the battery pack may be further lowered due to the electric current consumption by the BMS. In this case, charge energy of the battery pack may be so low that power supply cannot be provided from the battery pack to a load any longer.

To solve this problem, suggestions have been made to turn on the BMS only when the BMS needs to operate without needing to place the BMS in an ON state all the time. However, in this case, it is necessary to wake up the BMS again when the BMS is required to operate, for example, to charge the discharged battery module.

However, the circuit with conventional BMS wake-up technology is difficult to control due to its complex structure, and this problem may increase a defect rate.

DISCLOSURE

Technical Problem

The present disclosure is designed to solve the above-described problems, and therefore the present disclosure is directed to providing a battery management system (BMS) wake-up device with a simple structure.

These and other objects and advantages of the present disclosure will be understood by the following description and will be apparent from the embodiments of the present disclosure. Further, it will be readily understood that the objects and advantages of the present disclosure can be realized by the means set forth in the appended claims and combinations thereof.

Technical Solution

To achieve the above-described object, a battery management system (BMS) wake-up device according to an embodiment of the present disclosure wakes up a BMS in response to an external power signal received from an external power module, and includes a pulse generator configured to receive the external power signal from the external power module, receive source power through a different path from the external power signal, and generate a pulse signal depending on whether the source power is passed through when the pulse generator receives the external power signal, and a power output configured to supply the source power to the pulse generator, and output operating power for operating the battery management system based on the pulse signal when the power output module receives the pulse signal from the pulse generator.

Additionally, the pulse generator may include a switch disposed at a point of connection between an external power signal path through which the external power signal is provided and a path through which the source power is supplied, to open and close the path through which the source power is supplied based on the external power signal.

Additionally, the switch may be configured to allow the source power to pass when the external power signal of a preset reference voltage value or above is applied to the switch, and disallow the source power to pass when the external power signal of less than the preset reference voltage value is applied to the switch.

Additionally, the pulse generator may further include a switching controller disposed on the external power signal path to adjust the duration of the external power signal that is transmitted to the switch.

Additionally, the switching controller may be configured to reduce the duration of the external power signal that is transmitted to the switch when a predetermined time passes after the external power signal is applied.

Additionally, the switching controller may include a capacitor disposed on the external power signal path and charged by the external power signal, and a resistor disposed on a path connecting the external power signal path to ground.

Additionally, the switching controller may be configured to adjust the time during which the source power passes through the switch.

Additionally, the pulse generator may further include a discharge unit disposed between a first node and a ground to discharge an external device other than the external power module connected to the first node on the external power signal path, the first node disposed between the external power module and the switching controller.

Additionally, the pulse generator may further include an overcurrent protection unit disposed between the first node and the switching controller to prevent an overcurrent from being supplied to the switching controller and the switch.

Additionally, the pulse generator may further include an overvoltage protection unit disposed between a second node and a ground to prevent an overvoltage from being supplied to the switch, the second node disposed on the external power signal path between the switching controller and the switch.

In addition, to achieve the above-described object, a BMS according to the present disclosure includes the BMS wake-up device according to the present disclosure.

In addition, to achieve the above-described object, a battery pack according to the present disclosure includes the BMS wake-up device according to the present disclosure.

The overcurrent protection unit may include a resistor.

The BMS wake-up device further comprises a system controller connected to the power output and configured to receive operating power from the power output.

The system controller is configured to receive the operating power from the power output to operate the BMS, and the system controller is a micro controller unit (MCU) of the BMS.

The BMS wake-up device further comprises a first voltage measurer and a second voltage measurer, the BMS wake-up device is further connected to a battery module, and the first voltage measurer is configured to measure a voltage of a battery module and transmit the measured voltage of the battery module to the system controller.

The second voltage measurer is configured to measure a voltage of the external power signal from the external power module and transmit the measured voltage of the external power signal to the system controller.

The battery module includes a relay and the system controller is further configured to turn off the relay when the voltage of the battery module is below a reference voltage, and turn on the relay when the voltage of the external power signal is within a predetermined range.

The power output includes a converter, a first regulator, a pulse signal input, and a second regulator.

The pulse generator includes an external power input, a source power input, and a pulse signal output.

Advantageous Effects

According to an aspect of the present disclosure, in the battery management system (BMS) wake-up configuration, the circuit may be simplified, which makes it easy to control and reduces a defect rate.

Furthermore, according to another aspect of the present disclosure, it is possible to obtain a BMS wake-up device that may stably wake up a BMS through the overvoltage and overcurrent protection circuit.

Additionally, according to still another aspect of the present disclosure, it is possible to obtain a BMS wake-up device that increases the stability of the BMS circuit by discharging an external device to avoid the influence of the external device.

The present disclosure may have a variety of other effects, and these and other effects can be understood by the following description and will be apparent from the embodiments of the present disclosure.

BRIEF DESCRIPTION OF THE DRAWINGS

The accompanying drawings illustrate a preferred embodiment of the present disclosure, and together with the following detailed description of the present disclosure, serve to provide a further understanding of the technical aspects of the present disclosure, and thus the present disclosure should not be construed as limited to the drawings.

MODE FOR CARRYING OUT THE INVENTION

Hereinafter, the preferred embodiments of the present disclosure will be described in detail with reference to the accompanying drawings. Prior to the description, it should be understood that the terms or words used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the embodiments described herein and illustrations shown in the drawings are just a most preferred embodiment of the present disclosure, but not intended to fully describe the technical aspects of the present disclosure, so it should be understood that other equivalents and modifications could be made thereto at the time of filing the application.

Unless the context clearly indicates otherwise, it will be understood that the term "comprises" or "includes" when used in this specification, specifies the presence of stated elements, but does not preclude the presence or addition of one or more other elements. Additionally, the terms 'module' and 'unit' as used herein such as 'pulse generation module' and 'switching unit' refer to a logical processing unit of at least one function or operation and do not necessarily indicate a component that may be or should be physically separated from another, and it is obvious to those skilled in the art that each entity is not necessarily implemented by one physical element or device.

In addition, throughout the specification, when a portion is referred to as being "connected" to another portion, it is not limited to the case that they are "directly connected", but it also includes the case where they are "indirectly connected" with another element being interposed between them.

Figure 1:
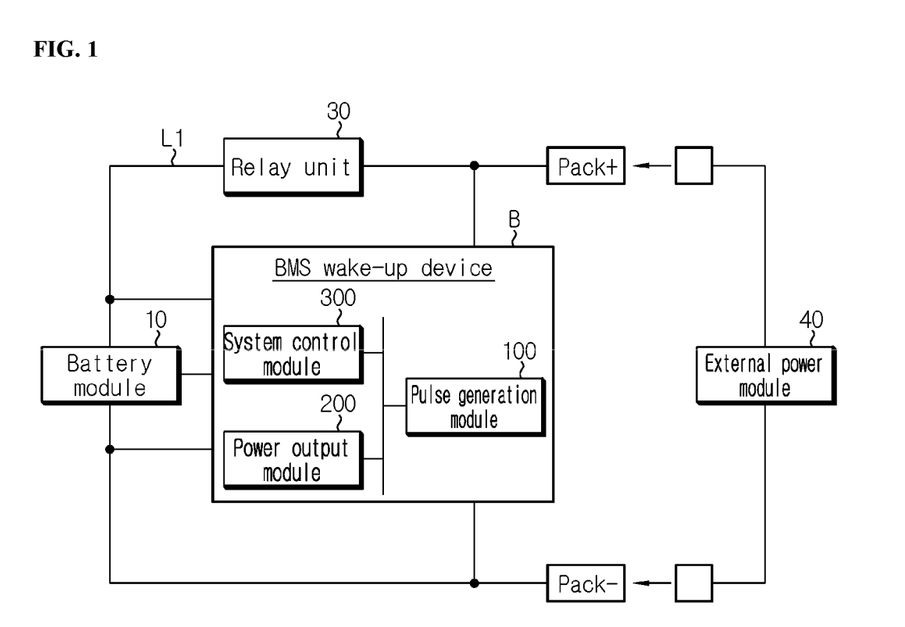
FIG. 1 is a schematic diagram showing the schematic configuration of a battery management system (BMS) wake-up device according to an embodiment of the present disclosure and a battery pack to which the BMS wake-up device is applied.
Figure 2:
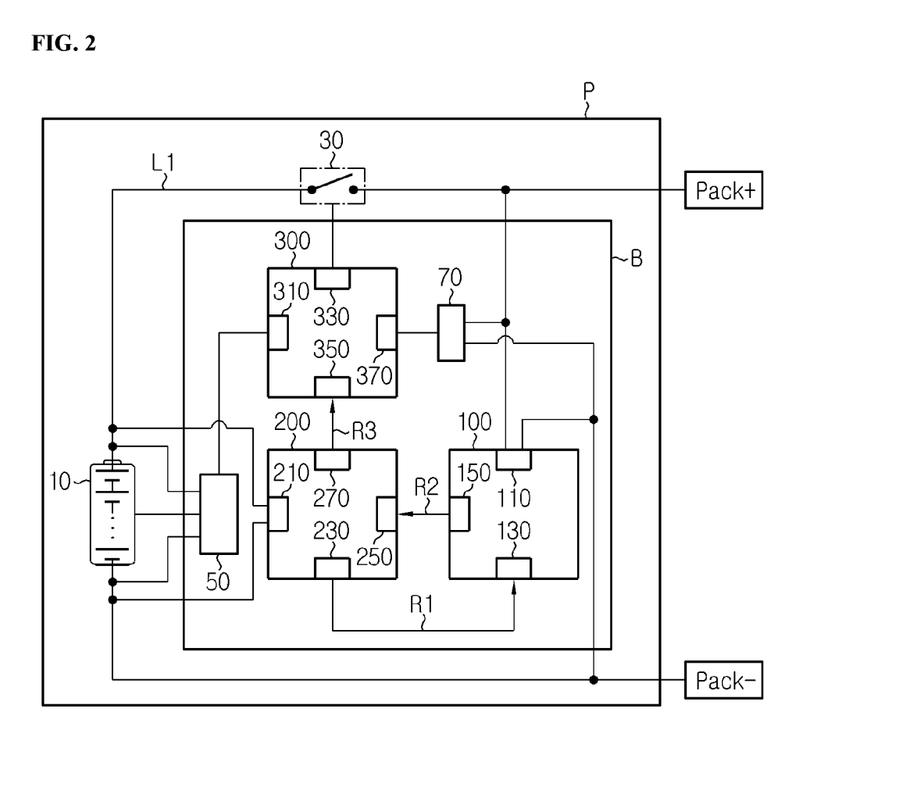
FIG. 2 is a detailed diagram showing that a BMS wake-up device according to an embodiment of the present disclosure is included in a battery pack and connected to many components.

FIG. 1 is a schematic diagram showing the schematic configuration of a battery management system (BMS) wake-up device according to an embodiment of the present disclosure and a battery pack to which the BMS wake-up device is applied. FIG. 2 is a detailed diagram showing that the BMS wake-up device according to an embodiment of the present disclosure is included in the battery pack and connected to many components.

Referring to FIGS. 1 and 2, the battery pack P to which the BMS wake-up device B, according to an embodiment of the present disclosure, is applied may include at least one battery module (unit) 10. In particular, although only one battery module 10 is shown in the drawings, the battery pack P may include a plurality of battery modules 10. In this case, each battery module 10 may be electrically connected in series and/or in parallel. Accordingly, the output and/or capacity of the battery pack P may be increased by the electrical connection of the battery modules 10.

Here, each battery module 10 may include at least one secondary battery. In particular, each battery module 10 may include a plurality of secondary batteries, and in this case, the plurality of secondary batteries provided in each battery module 10 may be electrically connected to each other to increase the output and/or capacity of the battery module 10. For example, the battery module 10 according to the present disclosure may be implemented with 12V output. However, the present disclosure is not limited thereto. Additionally, the battery pack P to which the BMS wake-up device B according to the present disclosure is applied may be mounted in a vehicle. That is, the battery pack P employing the BMS wake-up device B according to the present disclosure may be an automobile battery pack P. Here, the vehicle may be supplied with driving power for driving the vehicle or operating power for operating electrical equipment/accessories of the vehicle, such as an audio device or an air-conditioner (e.g., heating and air-conditioning system) by the battery pack P.

In particular, the vehicle, to which the BMS wake-up device B according to the present disclosure is applied, may be a vehicle supplied with driving power from the battery pack P, for example, an electric vehicle (EV), a hybrid electric vehicle (HEV), a plug-in hybrid electric vehicle (PHEV) or a conventional vehicle.

The battery pack P according to the present disclosure may further include a relay unit (relay, relay system) 30 and the BMS wake-up device B as shown in FIGS. 1 and 2.

The relay unit 30 may be disposed on the current path between the battery module 10 and the positive pack terminal Pack+ of the battery pack P to open and close the current path. In the configuration of FIGS. 1 and 2, the relay unit 30 may be disposed on the large current path L1 with one end connected to the positive module terminal of the battery module 10 and the other end connected to the positive pack terminal Pack+ of the battery pack P, to open and close the large current path L1. Here, the pack terminal Pack+, Pack− of the battery pack P may be connected to a load of the vehicle (e.g., any electrical load of the vehicle known to one of ordinary skill in the art), and the load of the vehicle may be an Electronic Control Unit (ECU), a motor or an air-conditioner (or a heater).

The BMS wake-up device B may be connected to the battery module 10 to receive power from the battery module 10. For example, as shown in the configuration of FIGS. 1 and 2, the BMS wake-up device B may be connected to two ends of the battery module 10 to receive power from the battery module 10.

The BMS wake-up device B according to the present disclosure may wake up a Battery Management System (BMS). That is, when the BMS is in a sleep mode (the BMS is not operated in the sleep mode and does not consume electrical energy), the BMS wake-up device B according to the present disclosure may shift the BMS from the sleep mode to a normal mode (the BMS is operated in the normal mode). In particular, the BMS wake-up device B according to the present disclosure may receive an external power signal from an external power module (external power unit or external power system) 40 to wake up the BMS.

To this end, the BMS wake-up device B according to the present disclosure may be connected to the external power module 40. For example, as shown in the embodiment of FIG. 1, the external power module 40 may provide an external power signal to the battery pack P through the pack terminal Pack+, Pack− of the battery pack P. In this case, the BMS wake-up device B may receive the external power signal from the external power module 40. Here, the external power module 40 may be implemented with power of various voltages, for example, 12V.

To receive the external power signal from the external power module 40, the BMS wake-up device B may be connected to the positive current path and the negative current path on the large current path L1. For example, as shown in FIGS. 1 and 2, the BMS wake-up device B may be connected to one point between the relay unit 30 and the positive pack terminal Pack+ of the battery pack P and one point between the negative module terminal of the battery module 10 and the negative pack terminal Pack− of the battery pack P. Additionally, when the external power module 40 is connected to the pack terminal Pack+, Pack− of the battery pack P, the external power signal may be provided from the external power module 40 to the BMS wake-up device B.

The BMS wake-up device B according to an embodiment of the present disclosure may include a pulse generation module (pulse generation unit or pulse generator) 100 and a power output module (power output unit or power output generator) 200 as shown in FIGS. 1 and 2.

The pulse generation module 100 may receive the external power signal from the external power module 40. That is, as described above, the pulse generation module 100 may be connected to the positive current path and the negative current path on the large current path L1 to receive the external power signal from the external power module 40. Here, a connection relationship between the pulse generation module 100 and the positive current path and the negative current path is described above in the connection relationship between the BMS wake-up device B and the external power module 40, and its detailed description is omitted herein.

The pulse generation module 100 may be supplied with source power. In particular, the pulse generation module 100 may be supplied with source power through a different path from the external power signal. Here, the source power supplied to the pulse generation module 100 may be power supplied from a different energy source from the external power module 40. For example, the source power may be power supplied from the inside of the BMS.

The pulse generation module 100 may generate a pulse signal. Here, the pulse generation module 100 may generate a pulse signal depending on whether the source power is passed. That is, the pulse generation module 100 may generate a pulse signal based on the source power passed through the pulse generation module 100. In particular, when the pulse generation module 100 receives the external power signal, the pulse generation module 100 may determine if the source power is passed based on the received external power signal.

The power output module 200 may supply the source power to the pulse generation module. That is, the power output module 200 may be connected to the pulse generation module 100 to transmit the source power to the pulse generation module 100. For example, the source power may be 5V power. However, the present disclosure is not limited to a particular magnitude of the source power.

The power output module 200 may output the operating power for operating the BMS. That is, when the power output module 200 receives the pulse signal from the pulse generation module 100, the power output module 200 may output the operating power based on the received pulse signal.

For example, as shown in the configuration of FIG. 2, the power output module 200 may transmit the source power to the pulse generation module 100 through the R1 path. Additionally, the power output module 200 may receive the pulse signal from the pulse generation module 100 through the R2 path that is different from the R1 path used to supply the source power to the pulse generation module 100. Here, the power output module 200 may output the operating power through R3 path that is different from the R1 path used to supply the source power and the R2 path used to receive the pulse signal.

According to the BMS wake-up device B of the present disclosure, in the BMS wake-up configuration, the circuit may be simplified, which makes it easy to control and reduces a defect rate.

Preferably, the BMS wake-up device B according to the present disclosure may further include a system control module (system control unit or system controller) 300 as shown in FIGS. 1 and 2.

The system control module 300 may be connected to the power output module 200 to receive the operating power from the power output module 200. Additionally, the system control module 300 may be supplied with the operating power from the power output module 200 to operate the BMS. Meanwhile, the system control module 300 may be implemented as a Micro Controller Unit (MCU) of the BMS. In other words, the system control module 300 may comprise a controller for operating the BMS.

Additionally, preferably, the BMS wake-up device B according to the present disclosure may further include a first voltage measuring unit (first voltage measurer) 50 and a second voltage measuring unit (second voltage measurer) 70 as shown in FIG. 2.

The first voltage measuring unit 50 may measure the voltage of the battery module 10, and transmit the measured information to the system control module 300. In particular, the first voltage measuring unit 50 may be connected to two ends of the battery module 10 to measure the voltage of the battery module 10 and to the system control module 300. In the case of a plurality of battery modules 10, the first voltage measuring unit 50 may be connected to two ends of each of the plurality of battery modules 10 to measure the voltage of each battery module 10. For example, the first voltage measuring unit 50 may measure the voltage of each battery module 10 in a preset cycle, and transmit the measured information to the system control module 300. That is, the first voltage measuring unit 50 may measure the voltage of each battery module 10 in the preset cycle and transmit, after each measuring (i.e., after each preset cycle), the measured information to the system control module 300.

The second voltage measuring unit 70 may measure the voltage of the external power signal provided from the external power module 40, and transmit the measured information to the system control module 300. For example, as shown in the configuration of FIG. 2, the second voltage measuring unit 70 may be connected to the path connecting one point between the relay unit 30 and the positive pack terminal Pack+ of the battery pack P to the pulse generation module 100. Additionally, the second voltage measuring unit 70 may also be connected to the path connecting one point between the negative module terminal of the battery module 10 and the negative pack terminal Pack− of the battery pack P to the pulse generation module 100. In this configuration, the second voltage measuring unit 70 may measure the voltage of the external power signal provided from the external power module 40 to the pulse generation module 100.

The function configuration of the pulse generation module 100, the power output module 200 and the system control module 300 and a connection relationship between the components will be described in detail in the description of FIGS. 3 to 5 below.

Meanwhile, in an embodiment of the present disclosure, the BMS wake-up device B may be implemented as one of various components of the BMS.

Figure 3:
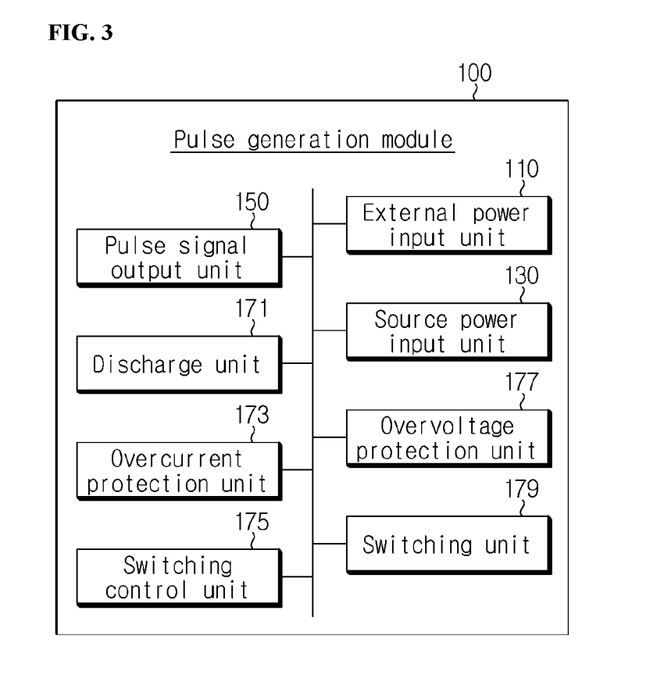
FIGS. 3 to 5 are schematic block diagrams showing the functional configuration of a pulse generation module, a power output module and a system control module according to an embodiment of the present disclosure.
Figure 4:
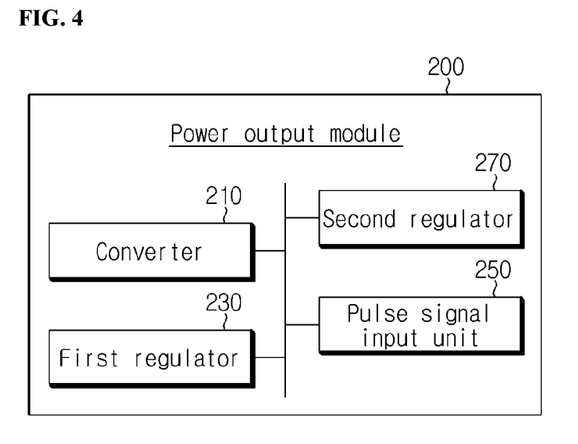
Figure 5:
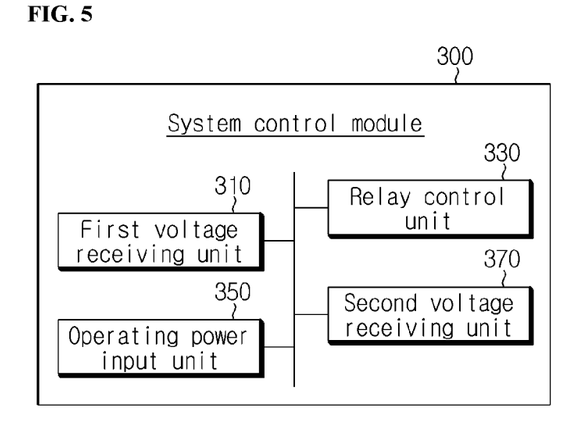

FIGS. 3 to 5 are schematic block diagram showing the functional configuration of the pulse generation module, the power output module and the system control module according to an embodiment of the present disclosure.

First, referring to FIGS. 2 and 3, the pulse generation module 100 may include an external power input unit (external power input) 110, a source power input unit (source power input) 130 and a pulse signal output unit (pulse signal output) 150.

The external power input unit 110 may be connected to the external power module 40 to receive an external power signal from the external power module 40. That is, the pulse generation module 100 may receive the external power signal outputted from the external power module 40 through the external power input unit 110. For example, as shown in the configuration of FIGS. 1 and 2, the external power input unit 110 is connected to the pack terminals Pack+, Pack− of the battery pack P to receive the external power signal from the external power module 40, when the external power module 40 is connected to the pack terminal Pack+, Pack−. For example, the external power signal may be 12V power.

The source power input unit 130 may be connected to the power output module 200 to receive the source power from the power output module 200 via the R1 path. Here, the source power input unit 130 may be implemented at a different location from the external power input unit 110 on the pulse generation module 100. That is, the pulse generation module 100 may be supplied with the source power through a different path from the external power signal. For example, the source power may be 5V power. That is, the source power may have less voltage that the external power signal.

The pulse signal output unit 150 may be connected to the power output module 200 to provide the pulse signal to the power output module 200. That is, the pulse generation module 100 may generate a pulse signal, and transmit the generated pulse signal to the power output module 200 through the pulse signal output unit 150. For example, the pulse signal may be a 5V signal.

Additionally, referring to FIGS. 2 and 4, the power output module 200 may include a converter 210, a first regulator 230, a pulse signal input unit (pulse signal input) 250 and a second regulator 270.

The converter 210 may be connected to two ends (e.g., the positive and negative battery terminals) of the battery module 10 (or the plurality of battery modules 10) to receive the power from the battery module 10 (or plurality of battery modules). That is, the converter 210 may transmit the power supplied from the battery module 10 (or plurality of battery modules) to the power output module 200. Here, the power output module 200 may generate the source power and/or the operating power based on the power supplied from the battery module 10. For example, the power output module 200 may convert the voltage of the 12V power supplied from the battery module 10 to generate each of 5V source power and the 5V operating power.

The first regulator 230 may supply the source power to the pulse generation module 100 via the R1 path to the power input unit 130. That is, the first regulator 230 may be connected to the source power input unit 130 of the pulse generation module 100 to transmit the source power to the source power input unit 130. For example, the first regulator 230 may output the source power based on the power supplied from the battery module 10 (or plurality of battery modules).

The pulse signal input unit 250 may receive the pulse signal from the pulse generation module 100. That is, the pulse signal input unit 250 may be connected to the pulse signal output unit 150 of the pulse generation module 100 via the R2 path to receive the input of the pulse signal from the pulse signal output unit 150.

The second regulator 270 may output the operating power for operating the BMS. That is, the second regulator 270 may be connected to the system control module 300 to supply the operating power to the system control module 300. For example, the operating power outputted from the second regulator 270 may be 5V power.

Additionally, referring to FIGS. 2 and 5, the system control module 300 may include a first voltage receiving unit (first voltage receiver) 310, a second voltage receiving unit (second voltage receiver) 370, a relay control unit (relay controller) 330 and an operating power input unit (operating power input) 350.

The first voltage receiving unit 310 may receive information of the battery module 10 (or plurality of battery modules) measured by the first voltage measuring unit 50. That is, the first voltage receiving unit 310 may be connected to the first voltage measuring unit 50 to receive information about the voltage of the battery module 10 (or plurality of battery modules) from the first voltage measuring unit 50.

The second voltage receiving unit 370 may receive the voltage of the external power signal measured by the second voltage measuring unit 70. That is, the second voltage receiving unit 370 may be connected (directly connected by having an electrical connection) to the second voltage measuring unit 70 to receive information about the voltage of the external power signal from the second voltage measuring unit 70.

The relay control unit 330 may control the opening/closing operation of the relay unit 30. That is, the relay control unit 330 may transmit a turn-off or turn-on signal to the relay unit 30 based on the information received from the first voltage receiving unit 310 or the second voltage receiving unit 370.

In more detail, the system control module 300 may measure the voltage of the battery module 10, and control the opening/closing operation of the relay unit 30 based on the measured voltage of the battery module 10. For example, when the battery module 10 is discharged so that the voltage of the battery module 10 is below a reference voltage value, the system control module 300 may turn off the relay unit 30. Here, the reference voltage value refers to a minimum voltage value of the battery module 10 for protecting the battery pack P from overdischarge (which is known to one of ordinary skill in the art to cause damage to the battery pack P), and the minimum voltage value may be set for each user. The reference voltage value may be pre-stored in the system control module 300. For example, when the reference voltage value is 10V, when the voltage across the two ends of the battery module 10 is below 10V, the system control module 300 may turn off the relay unit 30 to block the large current path L1.

Additionally, the BMS wake-up device B may turn on the relay unit 30 to charge the battery module 10. That is, when it is possible (or necessary) to charge the battery module 10, the BMS wake-up device B may turn on the relay unit 30 to supply the charge power to the battery module 10. Here, when the BMS wake-up device B receives the external power signal, the BMS wake-up device B may determine if it is possible to charge the battery module 10 based on the received external power signal. Its detailed description will be provided below.

The operating power input unit 350 may receive the input of the operating power from the power output module 200. That is, the operating power input unit 350 may be connected to the second regulator 270 to receive the operating power from the second regulator 270.

Preferably, the system control module 300 may be a processor (e.g., controller) that controls the BMS. Additionally, when the BMS wake-up device B according to the present disclosure is equipped in an automobile battery pack, the system control module 300 may communicate with the ECU of the vehicle. Through this, the system control module 300 may transmit and receive a signal to/from the ECU. Here, when the system control module 300 connected in communication with the ECU receives an operation signal from the ECU, the system control module 300 may operate. That is, the ECU may control the system control module 300 to operate.

For example, the operation mode of the system control module 300 according to the present disclosure may be classified into two modes, a sleep mode and a normal mode. Here, the sleep mode may be defined as a mode in which the system control module 300 does not operate, and the normal mode may be defined as a mode in which the system control module 300 operates. In other words, in the sleep mode, the system control module 300 may not operate due to disconnected communication (i.e., not being connected) with the ECU, and in the normal mode, the system control module 300 is connected in communication with the ECU and may operate.

That is, the system control module 300 may not operate the BMS in the sleep mode. Accordingly, the BMS may not consume the power of the battery module 10 in the sleep mode. For example, when the battery module 10 is over-discharged, the system control module 300 may turn off the relay unit 30 to block the large current path L1. Accordingly, the electrical equipment/accessories of the vehicle supplied with power through the large current path L1 may stop operating. For example, the ECU may stop operating by turning off of the relay unit 30, and accordingly, communication between the system control module 300 and the ECU may be disconnected. In this instance, the operation mode of the system control module 300 may be shifted to the sleep mode.

In an embodiment of the present disclosure, when external power is within a predetermined range, the system control module 300 may turn on the relay unit 30 to charge the battery module 10. For example, when external power is 10.5V to 14.8V, the system control module 300 may turn on the relay unit 30. In this case, the operation mode of the system control module 300 may be kept in normal mode. Additionally, when external power is outside of the predetermined range, the system control module 300 may keep the relay unit 30 in a turn-off (or turned-off or off) state. For example, when external power is 10.5V or less or 14.8V or above, the system control module 300 may keep the relay unit 30 in the turn-off state. In this case, the operation mode of the system control module 300 may be shifted back to the sleep mode.

When the relay unit 30 is controlled by the system control module 300, the relay unit 30 may be controlled according to the voltage range of external power of the external power module 40 as well as the state of the battery module 10. For example, when external power is 10.5V to 14.8V, the system control module 300 turns on the relay unit 30, but depending on the state of the battery module 10, the system control module 300 may not turn on the relay unit 30. For example, the system control module 300 may not turn on the relay unit 30 depending on the state of charge of the battery module 10. Here, the state of the battery module 10 may be differently defined for each user and stored in the system control module 300.

Figure 6:
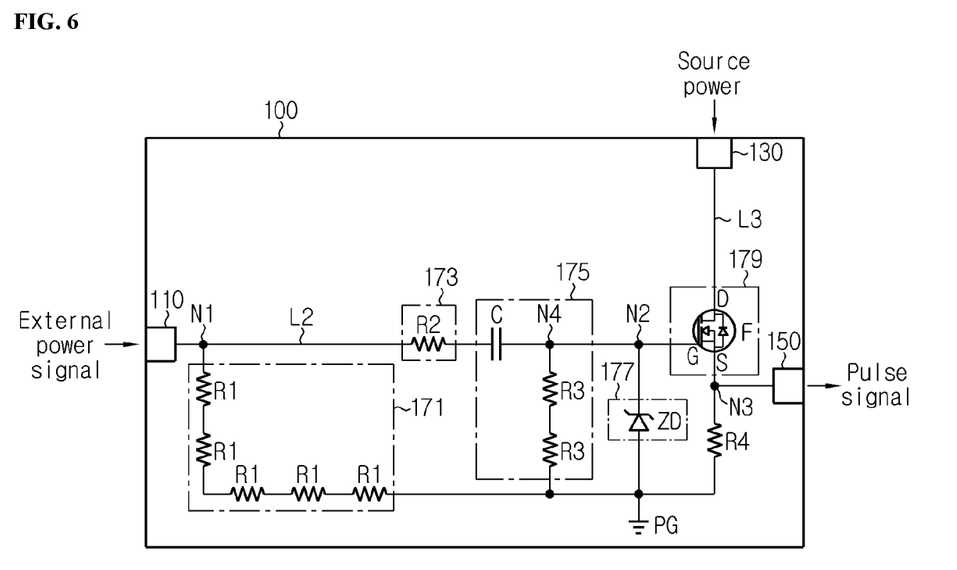
FIG. 6 is a diagram showing the detailed configuration of a pulse generation module according to an embodiment of the present disclosure.

FIG. 6 is a diagram showing the detailed configuration of the pulse generation module according to an embodiment of the present disclosure.

Additionally, referring to FIGS. 3 and 6, the pulse generation module 100 according to an embodiment of the present disclosure may include a switching unit (switch) 179.

The switching unit 179 may be disposed at a node or a point of connection between an external power signal path L2 through which the external power signal is supplied and a source power path L3 through which the source power is supplied.

For example, as shown in the configuration of FIG. 6, the switching unit 179 may be connected to each of the external power signal path L2 and the source power path L3. Here, the external power signal path L2 may have one end connected to the external power input unit 110 and the other end connected to the switching unit 179. Additionally, the source power path L3 may have one end connected to the source power input unit 130 and the other end connected to the switching unit 179. In this configuration, the external power signal may flow in the external power signal path L2, and the source power may flow in the source power path L3.

Preferably, the switching unit 179 according to the present disclosure may include a Field Effect Transistor (FET) F as shown in FIG. 6. The FET F may be disposed at the node where the external power signal path L2 and the source power path L3 meet, to perform a switching operation to allow or disallow the passage of the source power. That is, the FET F may perform a switching operation to allow or disallow the passage of the source power flowing in the source power path L3.

The FET F may be selectively turned on or turned off. The FET F is a Field Effect Transistor (FET) device including a gate terminal G, a drain terminal D and a source terminal S, and may be turned on or off depending on whether a channel is formed or not according to voltage applied between the gate terminal G and the source terminal S. The formation of the channel or no channel may be variously designed according to the configuration of the switching control unit (switching controller) 175. Here, the FET F may be ON when voltage applied between the gate terminal G and the source terminal S is equal to or larger than a threshold voltage Th. For example, the FET F may be a Metal Oxide Semiconductor Field Effect Transistor (MOSFET). The threshold voltage Th may be different depending on the FET F, and description is made herein under the assumption that the threshold voltage Th is 12V.

For example, as shown in the configuration of FIG. 6, the gate terminal G may be connected to the external power signal path L2, the drain terminal D may be connected to the source power path L3, and the source terminal S may be connected to a third node N3. For example, the ground PG is the ground of the BMS wake-up device B and may be connected to the vehicle body.

Preferably, when the external power signal equal to or larger than a preset reference voltage value is applied to the switching unit 179, the switching unit 179 may allow the source power to pass. For example, in the embodiment of FIG. 6, when the external power signal equal to or larger than the threshold voltage Th is applied to the gate terminal G, the FET F may be turned on to allow the source power to pass from the drain terminal D toward the source terminal S.

Additionally, when external power of less than the reference voltage value is applied to the switching unit 179, the switching unit 179 may disallow source power to pass. For example, in the embodiment of FIG. 6, when the external power signal of less than the threshold voltage Th is applied to the gate terminal G, the FET F may be OFF to disallow source power to pass from the drain terminal D toward the source terminal S. That is, when the external power signal of less than the threshold voltage Th is applied to the gate terminal G, the FET F may be off and no power will pass from the drain terminal D to the source terminal S.

More preferably, the pulse generation module 100 according to the present disclosure may further include a switching control unit 175 as shown in FIGS. 3 and 6.

The switching control unit 175 may be disposed on the external power signal path L2. For example, as shown in the configuration of FIG. 6, the switching control unit 175 may be disposed between the external power input unit 110 and the switching unit 179 to adjust the time of the external power signal that is transmitted to the switching unit 179. That is, the switching control unit 175 may adjust the time (e.g., duration) of the external power signal that is applied to the gate terminal G of the FET F.

More preferably, the switching control unit 175 may be configured to allow the external power signal transmitted to the switching unit 179 to be transmitted for a designed time. In particular, the switching control unit 175 may allow the external power signal applied to the gate terminal G of the FET F to be transmitted for the designed time after the external power signal is applied from the external power input unit 110. For example, the switching control unit 175 may allow the external power signal applied to the gate terminal G of the FET F to be transmitted for the designed time, for example, 120 ms, after the external power signal of 12V is applied from the external power input unit 110.

To this end, the switching control unit 175 may include a capacitor C and a resistor R3. Further, the switching control unit 175 may include a capacitor C and a plurality of resistors R3, where each of the plurality of resistors R3 are serially connected to one another. The plurality of resistors may comprise two or more resistors R3. For example, as shown in the configuration of FIG. 6, the capacitor C may be disposed on the external power signal path L2, and may be charged by the external power signal. Additionally, the resistor R3 may be disposed on the path connecting one point or a fourth node N4 on the external power signal path L2 between the capacitor C and the switching unit 179 to the ground PG. In this instance, a plurality of resistors R3 may be provided. Further, the plurality of resistors R3 may be connected in series.

When the external power signal is applied, the capacitor C may be charged by the external power signal. Here, when the external power signal is applied, the capacitor C may transmit the external power signal to the gate terminal G. For example, when the external power signal having the voltage of 12V is applied to the capacitor C through the external power input unit 110, the capacitor C may transmit the external power signal of 12V to the gate terminal G, and may be charged by the external power signal.

Additionally, after the capacitor C is charged by the external power signal, the external power signal transmitted to the gate terminal G may be shut off. For example, the external power signal applied to the gate terminal G of the FET F may slowly reduce from 12V to 0V. This is because the external power signal applied from the external power module 40 charges the capacitor C and the charge is completed, the external power signal cannot be transmitted to the gate terminal G any longer. Here, the gate terminal G may be connected to the ground PG through the resistor R3. In this case, when the external power signal is not applied, the charged capacitor C may be discharged through the ground PG and the voltage of the gate terminal G may be lowered from 12V to 0V.

More preferably, the switching control unit 175 may be configured to adjust the time during which the source power passes through the switching unit 179. That is, the switching control unit 175 may be configured to adjust the time during which the source power is applied to the gate terminal G according to the capacitance of the capacitor C and the size value of the resistor R3. For example, the higher the capacitance of the capacitor C is, the longer the source power may pass through the switching unit 179.

Additionally, preferably, the pulse generation module 100 according to an embodiment of the present disclosure may further include a discharge unit 171 as shown in FIGS. 3 and 6.

The discharge unit 171 may be disposed between a first node N1 disposed between the external power module 40 and the switching control unit 175, and the ground PG. For example, as shown in FIG. 6, the discharge unit 171 may be disposed on the path connecting the first node N1 on the external power signal path L2 between the external power input unit 110 and the switching control unit 175 to the ground PG.

The discharge unit 171 may discharge an external device other than the external power module 40 connected to the first node N1 on the external power signal path L2. That is, the discharge unit 171 may discharge the external device connected to the first node N1 through the external power input unit 110. For example, the external device may be the electrical equipment/accessories of the vehicle. Through this, the discharge unit 171 may discharge the power supplied to the external power input unit 110 from the external device to prevent the capacitor C from being charged before the external power signal is provided from the external power module 40.

For example, as shown in the configuration of FIG. 6, the discharge unit 171 may include a discharge resistor R1. In particular, a plurality of discharge resistors R1 may be provided. Here, the plurality of discharge resistors R1 may be connected in series.

According to the present disclosure, it is possible to obtain the BMS wake-up device B that may increase the stability of the circuit by discharging the external device to avoid the influence of the external device.

More preferably, the pulse generation module 100 according to an embodiment of the present disclosure may further include an overcurrent protection unit 173 as shown in FIGS. 3 and 6.

The overcurrent protection unit 173 may be disposed between the first node N1 and the switching control unit 175. For example, as shown in FIG. 6, the overcurrent protection unit 173 may be disposed on the external power signal path L2 between the first node N1 and the switching control unit 175.

The overcurrent protection unit 173 may prevent the overcurrent from being supplied to the switching control unit 175 and the switching unit 179. That is, the overcurrent protection unit 173 may be configured to prevent the overcurrent from flowing on the external power signal path L2. For example, the overcurrent protection unit 173 may include a protection resistor R2. Here, the protection resistor R2 and the discharge resistor R1 may be implemented in different sizes. For example, the size of the protection resistor R2 may be smaller than the size of the discharge resistor R1.

Additionally, preferably, the pulse generation module 100 according to an embodiment of the present disclosure may further include an overvoltage protection unit 177 as shown in FIGS. 3 and 6.

The overvoltage protection unit 177 may be disposed on the path connecting a second node N2 on the external power signal path L2 between the switching control unit 175 and the switching unit 179 to the ground PG. For example, the overvoltage protection unit 177 may include a Zener diode ZD.

The overvoltage protection unit 177 may prevent the overvoltage from being supplied to the switching unit 179. That is, when external power transmitted to the gate terminal G through the switching control unit 175 is overvoltage, the overvoltage protection unit 177 may prevent the overvoltage from being transmitted to the switching unit 179. For example, when 15V is set as overvoltage, the overvoltage protection unit 177 may prevent the external power signal of 15V or above from being transmitted to the switching unit 179 to protect the FET F of the switching unit 179.

For example, as shown in the configuration of FIG. 6, the Zener diode ZD provided in the overvoltage protection unit 177 may set a direction from the second node N2 to the ground PG as a forward direction of conduction. Here, for the voltage across the second node N2 and the ground PG, the Zener diode ZD may set an overvoltage reference value according to a preset value of the Zener diode ZD. In this configuration, when voltage less than the overvoltage is applied to the second node N2, the overvoltage protection unit 177 may transmit the voltage applied to the second node N2 to the switching unit 179. Additionally, when voltage equal to or larger than the overvoltage is applied to the second node N2, the overvoltage protection unit 177 may limit the voltage according to the present value to prevent the overvoltage applied to the second node N2 from being transmitted to the switching unit 179.

According to the present disclosure, it is possible to obtain the BMS wake-up device B that can stably wake up the BMS through the overvoltage and overcurrent protection circuits.

Figure 7:
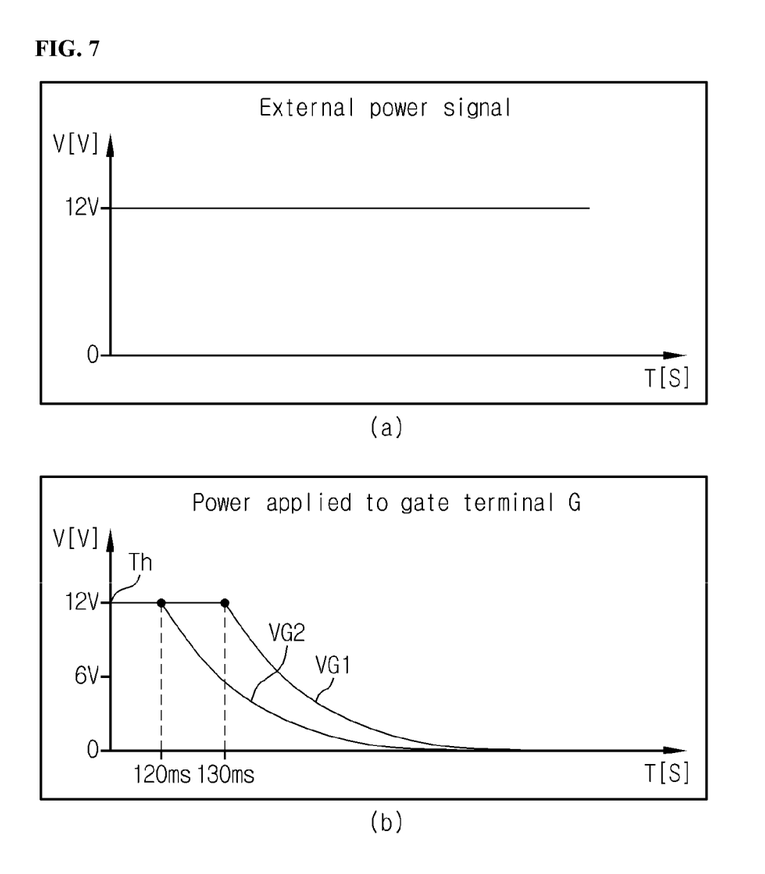
FIG. 7 is a schematic graph showing voltage changes of an external power signal provided from an external power module and power applied to a gate terminal of a switching unit over time according to an embodiment of the present disclosure.

FIG. 7 is a schematic graph showing voltage changes of the external power signal provided from the external power module and power applied to the gate terminal of the switching unit over time according to an embodiment of the present disclosure.

In more detail, the graph (a) of FIG. 7 is a graph showing voltage variation of the external power signal over time, and the graph (b) of FIG. 7 is a graph showing the magnitude variation of voltage applied to the gate terminal of the switching unit by the external power signal over time. That is, the graph (b) of FIG. 7 shows voltage changes of the gate terminal G over time after the external power signal is applied to the pulse generation module from the external power module 40.

Referring to FIG. 7, when an external power signal is applied to the pulse generation module 100, the external power signal may be applied to the gate terminal G of the switching unit included in the pulse generation module. For example, in the graphs (a) and (b) of FIG. 7, when an external power signal of 12V is applied to the pulse generation module 100 from the external power module 40, the initial voltages of the external power signal and the gate terminal G may be equally 12V.

However, the voltage of the gate terminal G may be slowly lowered according to the capacitance of the capacitor C of the switching control unit 175. In this instance, the voltage-time graph may be differently implemented depending on the capacitance of the capacitor C of the switching control unit 175. For example, the graph (b) of FIG. 7 shows a voltage-time graph when the capacitance value of the capacitor C of the first graph VG1 is larger than the capacitance value of the capacitor C of the second graph VG2.

The source power may pass through the switching unit 179 for the designed time. For example, in the graph (b) of FIG. 7, when the threshold voltage Th of the switching unit 179 is 12V, the time during which the source power passes 12V may be 130 ms in the case of the first graph VG1, and 120 ms in the case of the second graph VG2.

Figure 8:
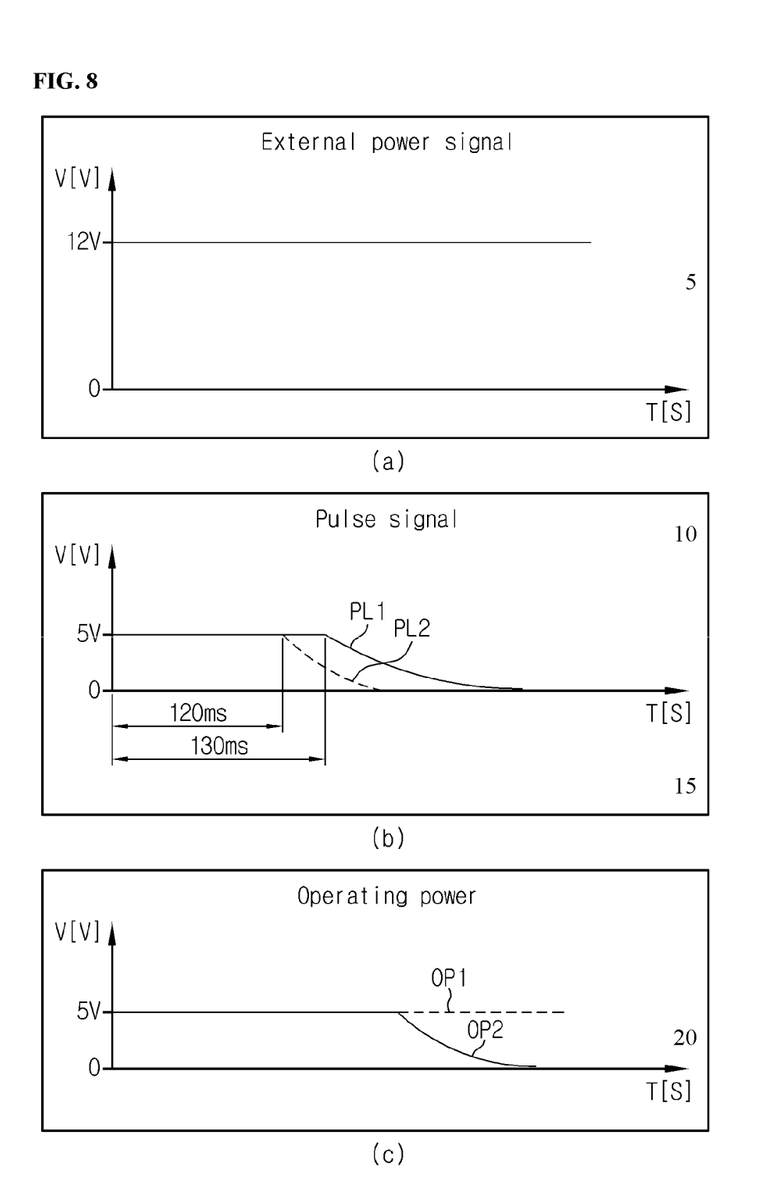
FIG. 8 is a schematic graph showing voltage changes of an external power signal, a pulse signal and operating power over time according to an embodiment of the present disclosure.

FIG. 8 is a schematic graph showing voltage changes of the external power signal, the pulse signal and the operating power over time according to an embodiment of the present disclosure.

In particular, FIG. 8 shows voltage changes of the external power signal applied from the external power module 40 ((a) of FIG. 8), the pulse signal generated from the pulse generation module 100 ((b) of FIG. 8) and the operating power outputted from the power output module 200 ((c) of FIG. 8) over time.

Referring to FIG. 8, when the external power signal is applied, the pulse generation module 100 may determine if the source power passes through the switching unit 179 and may generate a pulse signal. That is, the pulse generation module 100 may allow the source power to pass for the predetermined time based on the external power signal to generate a pulse signal.

For example, the graph (b) of FIG. 8 shows a first pulse signal PL1 of 5V generated for 130 ms determined in the first graph VG1 of FIG. 7. Additionally, the graph (b) of FIG. 8 show a second pulse signal PL2 of 5V generated for 120 ms determined in the second graph VG2 of FIG. 7.

Meanwhile, when the voltage of the external power signal applied to the gate terminal G of the switching unit 179 is less than the threshold voltage, the pulse generation module 100 may not generate a pulse signal. That is, when the voltage of the external power signal applied to the gate terminal G of the switching unit 179 is less than the threshold voltage, the pulse generation module 100 may disallow the source power to pass.

For example, the graph (b) of FIG. 8 is a voltage-time graph of the first pulse signal PL1 in which a pulse signal of 5V is not generated from the point of 130 ms where the first graph VG1 of FIG. 7 goes down below the threshold voltage of 12V. Additionally, the graph (b) of FIG. 8 is a voltage-time graph of the second pulse signal PL2 in which a pulse signal of 5V is not generated from the point of 120 ms where the second graph VG2 of FIG. 7 goes down below the threshold voltage of 12V.

When the power output module 200 receives the pulse signal from the pulse generation module 100, the power output module may output the operating power. That is, when the power output module 200 receives the pulse signal, the power output module 200 may transmit the operating power to the system control module 300 to wake up the BMS. In this instance, the system control module 300 may be supplied with the operating power from the power output module and measure the voltage of the external power signal. Additionally, the system control module 300 may control the operating power outputted from the power output module 200 based on the measured voltage of the external power signal.

Here, referring to the first operating power graph OP1 and the second operating power graph OP2 shown in the graph (c) of FIG. 8, when the voltage of the external power signal corresponds to the predetermined range, the system control module 300 may continue to output the operating power as shown in the first operating power graph OP1. On the contrary, when the voltage of the external power signal does not correspond to the predetermined range, the system control module 300 may not continue to output the operating power as shown in the second operating power graph OP2.

For example, in the first operating power graph OP1 shown in the graph (c) of FIG. 8, when the external power signal is 10.5V to 14.8V, the system control module 300 may turn on the relay unit 30 to charge the battery module 10, and control the power output module 200 to continuously output the operating power. In this case, the operation mode of the system control module 300 may be kept in normal mode. Additionally, in the second operating power graph OP2 shown in the graph (c) of FIG. 8, when the external power signal is 10.5V or less or 14.8V or above, the system control module 300 may keep the relay unit 30 in turn-off state, and control the power output module 200 to stop outputting the operating power. In this case, the operation mode of the system control module may be shifted back to the sleep mode.

The BMS wake-up device B according to the present disclosure may wake up the BMS from the sleep mode through an external power supply.

In particular, the BMS wake-up device B according to the present disclosure may be applied even when the battery pack 10 is in a discharged state. That is, when the battery pack, for example, the automobile battery pack is discharged, the BMS is usually in off state. In this instance, when a charger is connected to the battery pack 10 to charge the battery pack 10, the BMS wake-up device B according to the present disclosure may wake up the BMS with the supplied external power for the charge power of the external charger.

However, the present disclosure is not necessarily limited to this type of application. For example, in the case in which the battery pack is mounted on the vehicle, when the vehicle starts, external power may be supplied to the BMS wake-up device to enable the BMS wake-up device to wake up the BMS.

The BMS wake-up device according to the present disclosure may be applied to a BMS. That is, the BMS according to the present disclosure may include the BMS wake-up device according to the present disclosure as described above. In this configuration, at least some of the components of the BMS wake-up device according to the present disclosure may be implemented by supplementing or adding the functions of the components included in the conventional BMS. For example, the power output module 200 and the system control module 300 of the BMS wake-up device according to the present disclosure may be implemented as the components of the BMS.

Additionally, the BMS wake-up device according to the present disclosure may be provided in a battery pack. That is, the battery pack according to the present disclosure may include the BMS wake-up device according to the present disclosure as described above. Here, the battery pack may include one or more secondary batteries, the BMS wake-up device, electrical equipment/accessories (BMS, relay, fuse, etc.,) and a case.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

Additionally, many substitutions, modifications and changes may be made to the present disclosure described hereinabove by those skilled in the art without departing from the technical aspects of the present disclosure, and the present disclosure is not limited to the above-described embodiments and the accompanying drawings, and each embodiment may be selectively combined in part or in whole to allow various modifications.

What is claimed is:

1. A battery management system (BMS) wake-up device for waking up a BMS, the BMS wake-up device comprising:
a pulse generator configured to:
receive an external power signal from an external power module,
receive source power through a different path from the external power signal, and
generate a pulse signal depending on whether the source power is passed through, wherein the source power is passed through in response to the external power signal having a voltage value at or above a preset reference voltage value; and
a power output configured to supply the source power to the pulse generator, and output operating power for operating the battery management system based on the pulse signal in response to the power output receiving the pulse signal from the pulse generator.

2. The BMS wake-up device according to claim 1, wherein the pulse generator includes a switch disposed at a point of connection between an external power signal path through which the external power signal is provided and a path through which the source power is supplied, to open and close the path through which the source power is supplied based on the external power signal.

3. The BMS wake-up device according to claim 2, wherein the switch is configured to allow the source power to pass when the external power signal of the preset reference voltage value or above is applied to the switch, and disallow the source power to pass when the external power signal of less than the preset reference voltage value is applied to the switch.

4. The BMS wake-up device according to claim 3, wherein the pulse generator further includes a switching controller disposed on the external power signal path to adjust a duration of the external power signal that is transmitted to the switch.

5. The BMS wake-up device according to claim 4, wherein the switching controller is configured to reduce the duration of the external power signal that is transmitted to the switch when a predetermined time passes after the external power signal is applied.

6. The BMS wake-up device according to claim 5, wherein the switching controller includes a capacitor disposed on the external power signal path and is charged by the external power signal, and a resistor disposed on a path connecting the external power signal path to a ground.

7. The BMS wake-up device according to claim 6, wherein the switching controller is configured to adjust the duration during which the source power passes through the switch.

8. The BMS wake-up device according to claim 4, wherein the pulse generator further includes a discharge unit disposed between a first node and a ground to discharge an external device, other than the external power module, connected to the first node on the external power signal path, the first node disposed between the external power module and the switching controller.

9. The BMS wake-up device according to claim 8, wherein the pulse generator further includes an overcurrent protection unit disposed between the first node and the switching controller to prevent an overcurrent from being supplied to the switching controller and the switch.

10. The BMS wake-up device according to claim 9, wherein the overcurrent protection unit includes a resistor.

11. The BMS wake-up device according to claim 8, wherein the pulse generator further includes an overvoltage protection unit disposed between a second node and a ground to prevent an overvoltage from being supplied to the switch, the second node disposed on the external power signal path between the switching controller and the switch.

12. A battery management system (BMS) comprising the BMS wake-up device according to claim 1.

13. A battery pack comprising the BMS wake-up device according to claim 1.

14. The BMS wake-up device according to claim 1, further comprising a system controller connected to the power output and configured to receive operating power from the power output.

15. The BMS wake-up device according to claim 14, further comprising a first voltage measurer and a second voltage measurer, wherein the BMS wake-up device is connected to a battery module, and wherein the first voltage measurer is configured to measure a voltage of the battery module and transmit the measured voltage of the battery module to the system controller.

16. The BMS wake-up device according to claim 15, wherein the second voltage measurer is configured to measure a voltage of the external power signal from the external power module and transmit the measured voltage of the external power signal to the system controller.

17. The BMS wake-up device according to claim 16, wherein the battery, module includes a relay, wherein the system controller is further configured to:
turn off the relay when the voltage of the battery module is below a reference voltage, and
turn on the relay when the voltage of the eternal power signal is within a predetermined range.

18. The BMS wake-up device according to claim 1, wherein the pulse generator includes an external power input, a source power input, and a pulse signal output.

19. A battery management system (BMS) wake-up device for waking up a BMS in response to an external power signal received from an external power module, the BMS wake-up device comprising:

a pulse generator configured to:
receive the external power signal from the external power module,
receive source power through a different path from the external power signal, and
generate a pulse signal depending on whether the source power is passed through in response to the pulse generator receiving the external power signal;

a power output configured to supply the source power to the pulse generator, and output operating power for operating the battery management system based on the pulse signal in response to the power output receiving the pulse signal from the pulse generator; and a system controller connected to the power output and configured to receive operating power from the power output, wherein the system controller is configured to receive the operating power from the power output to operate the BMS, and the system controller is a micro controller unit (MCU) of the BMS.

20. A battery management system (BMS) wake-up device for waking up a BMS in response to an external power signal received from an external power module, the BMS wake-up device comprising:

a pulse generator configured to:
receive the external power signal from the external power module,
receive source power through a different path from the external power signal, and
generate a pulse signal depending on whether the source power is passed through in response to the pulse generator receiving the external power signal; and a power output configured to supply the source power to the pulse generator, and output operating power for operating the battery management system based on the pulse signal in response to the power output receiving the pulse signal from the pulse generator, wherein the power output includes a converter, a first regulator, a pulse signal input, and a second regulator.

* * * * *